United States Patent
Schneider et al.

(10) Patent No.: US 11,936,260 B2
(45) Date of Patent: Mar. 19, 2024

(54) STATOR FOR AN ELECTRIC MACHINE, ELECTRIC MACHINE, MOTOR VEHICLE, METHOD FOR PRODUCING A STATOR

(71) Applicant: Dr. Ing. h.c. F. Porsche Aktiengesellschaft, Stuttgart (DE)

(72) Inventors: Joerg Schneider, Stuttgart (DE); Andreas Lober, Westheim (DE); Rolf Graef, Kornwestheim (DE); Tobias Schmack, Stuttgart (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 21 days.

(21) Appl. No.: 17/359,700

(22) Filed: Jun. 28, 2021

(65) Prior Publication Data
US 2022/0006343 A1 Jan. 6, 2022

(30) Foreign Application Priority Data
Jul. 2, 2020 (DE) ...................... 10 2020 117 464.0

(51) Int. Cl.
*H02K 3/12* (2006.01)
*H02K 1/16* (2006.01)
(Continued)

(52) U.S. Cl.
CPC ................ *H02K 3/12* (2013.01); *H02K 1/16* (2013.01); *H02K 3/14* (2013.01); *H02K 3/32* (2013.01);
(Continued)

(58) Field of Classification Search
CPC ......... H02K 3/12–14; H02K 3/38; H02K 5/15
(Continued)

(56) References Cited

U.S. PATENT DOCUMENTS

| 11,646,621 B2 | 5/2023 | Huber et al. |
| 2002/0047483 A1 | 4/2002 | Oohashi et al. |

(Continued)

FOREIGN PATENT DOCUMENTS

| CN | 1251478 A | 4/2000 |
| CN | 106230144 A | 12/2016 |

(Continued)

OTHER PUBLICATIONS

Machine translation of WO 2020239368 A1, Year 2020 (Year: 2020).*
Machine translation of WO 2021122257 A1, Year 2021 (Year: 2021).*

*Primary Examiner* — Quyen P Leung
*Assistant Examiner* — Minki Chang
(74) *Attorney, Agent, or Firm* — LEYDIG, VOIT & MAYER, LTD.

(57) ABSTRACT

A stator for an electric machine includes: a laminated stator core including stator grooves and having a plug-in side and a bending side, which bending side lies opposite the plug-in side in an axial direction; a stator winding having hairpin elements which are pushed into the stator grooves on the plug-in side of the laminated stator core and bent and electrically connected to the stator winding on the bending side of the laminated stator core; and an end plate which is arranged on the plug-in side in the axial direction between the laminated stator core and the hairpin elements. The hairpin elements are arranged in the axial direction so as to bear against the end plate.

12 Claims, 2 Drawing Sheets

(51) Int. Cl.
    *H02K 3/14*     (2006.01)
    *H02K 3/32*     (2006.01)
    *H02K 3/38*     (2006.01)
    *H02K 3/48*     (2006.01)
    *H02K 15/06*    (2006.01)

(52) U.S. Cl.
    CPC ............ *H02K 3/48* (2013.01); *H02K 15/064* (2013.01); *H02K 3/38* (2013.01)

(58) Field of Classification Search
    USPC ................... 310/216.114–216.115, 400–417
    See application file for complete search history.

(56) References Cited

U.S. PATENT DOCUMENTS

| | | | |
|---|---|---|---|
| 2012/0326554 A1 | 12/2012 | Kinpara et al. | |
| 2017/0005537 A1* | 1/2017 | Matahira | H02K 1/16 |
| 2021/0344245 A1* | 11/2021 | Wittmann | H02K 15/12 |

FOREIGN PATENT DOCUMENTS

| | | | | |
|---|---|---|---|---|
| CN | 111052552 A | 4/2020 | | |
| DE | 60018550 T2 | 2/2006 | | |
| DE | 102010003127 A1 | 9/2011 | | |
| DE | 102010055821 A1 | 6/2012 | | |
| DE | 102012012569 A1 | 12/2012 | | |
| EP | 3240149 B1 | 6/2019 | | |
| WO | WO-2020239368 A1 * | 12/2020 | ......... | H02K 15/0087 |
| WO | WO-2021122257 A1 * | 6/2021 | ............... | H02K 3/12 |

\* cited by examiner

STATOR FOR AN ELECTRIC MACHINE, ELECTRIC MACHINE, MOTOR VEHICLE, METHOD FOR PRODUCING A STATOR

CROSS-REFERENCE TO PRIOR APPLICATION

Priority is claimed to German Patent Application No. DE 10 2020 117 464.0, filed on Jul. 2, 2020, the entire disclosure of which is hereby incorporated by reference herein.

FIELD

The present invention relates to a stator for an electric machine, to an electric machine, to a motor vehicle and to a method for producing a stator for an electric machine.

BACKGROUND

In the case of the series production of high performance electric machines, stator windings consisting of what are known as hairpin elements are usually used. Hairpin elements are substantially U-shaped electric conductors which have two limbs which run straight in parallel. The limbs are connected to a clip. The limbs of the hairpin elements are pushed in the axial direction into stator grooves of the laminated stator core in such a way that the clips are arranged on the one axial end side of the laminated stator core and the ends of the limbs protrude on the other axial end side of the laminated stator core. Said ends are possibly stripped, bent to form a winding and connected, for example welded.

During the bending of the winding, in particular, axial movements of the hairpin elements can occur. This and an imprecise pushing in of the hairpin elements can have a negative influence on the dimensional accuracy of the predefined winding head geometries. In addition, a defined length of the ends of the limbs is essential for highly precise manufacturing of the winding, in particular for precise bending and connecting of the ends of the limbs, which defined length can be ensured merely with difficulty, however, as a result of relative movements between the hairpin elements and the laminated stator core.

Stators for electric machines are already known from the prior art, which stators have end plates on the axial end sides of the laminated stator cores. For instance, document DE 10 2010 055 821 A1 discloses metallic end plates which are welded or soldered to the end sides of the laminated stator core for mechanically stably receiving a winding head isolation means.

SUMMARY

In an embodiment, the present invention provides a stator for an electric machine, comprising: a laminated stator core comprising stator grooves and having a plug-in side and a bending side, which bending side lies opposite the plug-in side in an axial direction; a stator winding having hairpin elements which are pushed into the stator grooves on the plug-in side of the laminated stator core and bent and electrically connected to the stator winding on the bending side of the laminated stator core; and an end plate which is arranged on the plug-in side in the axial direction between the laminated stator core and the hairpin elements, wherein the hairpin elements are arranged in the axial direction so as to bear against the end plate.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
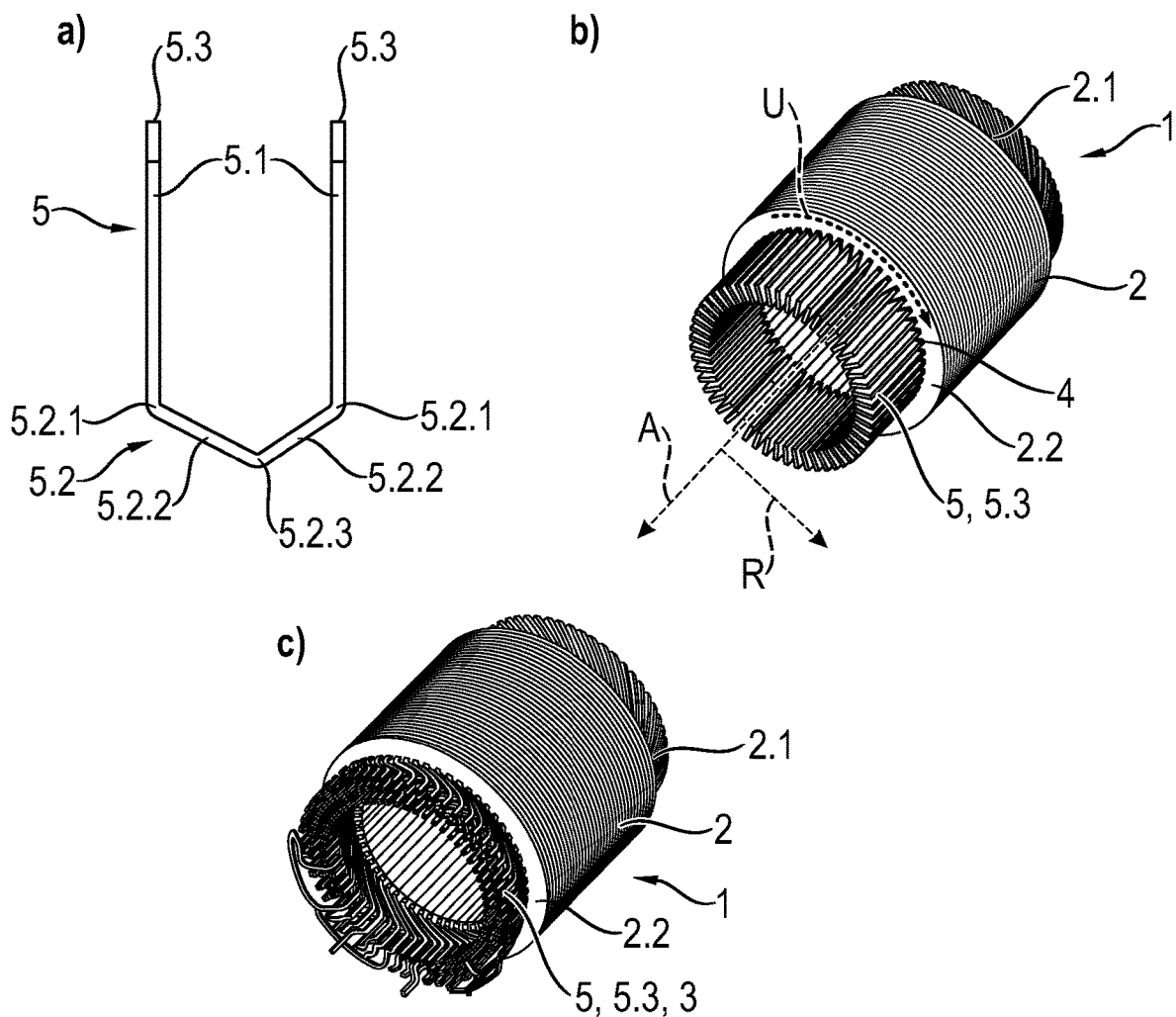
FIGS. 1(a)-(c) diagrammatically illustrate a hairpin element and a stator in accordance with one exemplary embodiment of the present invention.

In an embodiment, the present invention provides a stator for an electric machine, which stator does not have the above-described disadvantages of the prior art, but rather permits precise pushing of the hairpin elements into the laminated stator core and secure fixing of the hairpin elements during the production of the winding.

In an embodiment, the present invention provides a stator for an electric machine having a laminated stator core and a stator winding, the stator winding having hairpin elements which are pushed into stator grooves of the laminated stator core, the hairpin elements being pushed into the stator grooves on a plug-in side of the laminated stator core, and being bent and electrically connected to the stator winding on a bending side of the laminated stator core, which bending side lies opposite the plug-in side in the axial direction, the stator having an end plate which is arranged on the plug-in side in the axial direction between the laminated stator core and the hairpin elements, the hairpin elements being arranged in the axial direction so as to bear against the end plate.

The stator according to the invention can be produced very precisely. Pushing in of the hairpin elements during the manufacturing process is limited mechanically by way of the hairpin elements bearing against the end plate in the axial direction. This limit results in a defined spacing of the clips of the hairpin elements from the laminated stator core on the plug-in side and, as a result, a defined winding head geometry on the plug-in side. Furthermore, a defined length of the ends of the limbs for bending results. Furthermore, bearing against the end plate makes satisfactory fixing of the hairpin elements during the manufacturing possible, for example by way of a constant force which acts on the clamps in the axial direction during the bending and presses the hairpin elements against the end plate.

In the context of the present invention, the axial direction is the direction along the stator axis. In the context of the present invention, a radial direction lies perpendicularly on the axial direction and is directed outward starting from the stator axis.

It is provided in accordance with one preferred embodiment of the invention that the hairpin elements are pushed with in each case two straight limbs into the stator grooves, the limbs of a hairpin element being connected to a clip of the hairpin element, which clip is arranged at an angle with respect to the limbs, the end plate being configured in the axial direction so as to partially follow the contour of the clips of the hairpin elements. In the context of the present invention, following the contour means bearing along the contour. That is to say, the end plate bears against the clip where it follows the contour of the clip. As a result, a support of the hairpin element is advantageously achieved in an angular manner, in particular therefore also with a directional component orthogonally with respect to the axial direction. Secure fixing of the hairpin components and limiting of the push-in travel are advantageously improved as a result.

It is provided in accordance with a further preferred embodiment of the invention that a first limb of the first hairpin element is arranged in a first stator groove with a first clip which is arranged as to run in the circumferential direction of the stator, and a second limb of a second hairpin element is arranged in a second stator groove which is adjacent in the circumferential direction with respect to the first stator groove with a second clip which is arranged as to run counter to the circumferential direction, the first clip and the second clip crossing one another at a crossing spacing in the axial direction from the laminated stator core, the end plate being configured in the axial direction as to follow the contour of the first clip and the contour of the second clip as far as the crossing spacing. In other words, a space between the laminated stator core and the clips is defined by way of the clips, in which space the end plate is arranged in such a way that it partially follows the contour of the clips. The existing installation space is utilized in an optimum manner in this way, and secure resting of the hairpin elements on the end plate is made possible.

It is provided in accordance with a further preferred embodiment of the invention that the clips have arcuate first transition regions which are arranged on the limbs, and straight intermediate regions which are arranged on the first transition region, and an arcuate second transition region which is arranged between the intermediate regions, the end plate being configured in the axial direction so as to at least partially follow the contour of the first transition regions, but not being configured so as to follow the contour of the intermediate regions. As a result, it is avoided in an advantageous way that sharp angles and edges are produced on the end plate, and the hairpin elements can be damaged, for example in the region of an insulation, when the hairpin elements bear against the end plate.

It is provided in accordance with a further preferred embodiment of the invention that the first clip and the second clip are arranged so as to cross one another in the region of the first transition region of the first clip and the first transition region of the second clip. In other words, the clips span a type of round barrel vault which is filled by way of the end plate. Optimum resting of the hairpin elements is achieved as a result.

It is provided in accordance with a further preferred embodiment of the invention that the end plate has openings which are arranged so as to run in the axial direction, and through which the hairpin elements are pushed into the stator grooves. As a result, it is possible in an advantageous way that the limbs of the hairpin elements are also supported in the radial direction and in the circumferential direction when being pushed in. Damage of the laminated stator core can be avoided as a result. Furthermore, it is conceivable that the end plate bears in a fluid-tight manner against the hairpin elements in the region of the openings. This makes sealing of the stator grows with respect to the winding heads space possible.

To this end, it is preferably provided that only one hairpin element is pushed into each opening.

It is also conceivable, however, that all of the hairpin elements which run jointly in a stator groove are pushed into each opening, that is to say that an opening receives the limbs of the hairpin elements which are arranged jointly in a stator groove.

It is provided in accordance with a further preferred embodiment of the invention that the end plate is electrically non-conducting. This advantageously makes an electric insulation of the laminated stator core in the direction of the winding heads space possible. To this end, it is conceivable that the end plate has an insulation layer. It is also conceivable, however, that the end plate is produced from an insulating material.

It is provided in accordance with a further preferred embodiment of the invention that the end plate is elastic. This also advantageously prevents damage of the hairpin elements during the production of the stator. Furthermore, it is conceivable that vibrations during the operation of the stator are damped by way of the elastic end plate. It is conceivable, for example, that the end plate is produced from a rubber material. It is an advantage of the elastic configuration of the end plate, in particular, that the force during pushing in of the hairpin elements increases after the contact with the end plate with increasing deformation of the end plate. Therefore, defined pushing in is possible by way of a force measurement.

A further object of the invention for achieving the object worded at the outset is an electric machine having a stator according to the invention.

A further subject matter of the invention for achieving the object worded at the outset is a motor vehicle having an electric machine according to the invention.

A further subject matter of the invention for achieving the object worded at the outset is a method for producing a stator according to the invention, the hairpin elements being pushed into the laminated stator core in the axial direction, the pushing in of the hairpin elements in the axial direction being limited by way of contact of the hairpin elements with the end plate. As a result, the extent to which the hairpin elements are pushed in is defined and the hairpin elements are fixed in an advantageous way.

It is provided in accordance with a further preferred embodiment of the invention that a force which is necessary for pushing in the hairpin elements is measured, the pushing in being concluded when a maximum force is reached. As a result, a highly accurately defined position of the hairpin elements is achieved after the pushing in.

All of the details, features and advantages which have been disclosed above in conjunction with the state according to the invention likewise relate to the electric machine according to the invention, the motor vehicle according to the invention and to the method according to the invention.

FIG. 1(a) diagrammatically illustrates the hairpin element 5 for use in a stator. The hairpin element 5 is an electric conductor and is typically insulated apart from the ends 5.3 of the hairpin element 5. The name comes from the hairpin-like shape with the two limbs 5.1 which are arranged in a manner which is straight and parallel to one another, which limbs 5.1 are connected by way of a clip 5.2. The clip 5.2 has arcuate first transition regions 5.2.1 on the limbs 5.1. Straight intermediate regions 5.2.2 are arranged between the first transition regions 5.2.1 and an arcuate, centrally arranged second transition region 5.2.3.

FIG. 1(b) diagrammatically illustrates a stator 1 in accordance with one exemplary embodiment of the present invention during its production by way of a method in accordance with one exemplary embodiment of the present invention. The hairpin elements 5 are pushed in the axial direction A into stator grooves 4 of a laminated stator core 2. Here, the hairpin elements 5 are pushed in on a plug-in side 2.1 in such a way that the ends 5.3 of the hairpin elements 5 project out of the laminated stator core 2 on a bending side 2.2 which lies opposite the plug-in side 2.1 in the axial direction A. In order to ensure the correct seating of the hairpin elements 5, an end plate (not visible here for perspective reasons, see FIG. 2) is provided on the plug-in side 2.1, against which end plate the hairpin elements 5 bear in the axial direction A.

Furthermore, the radial direction R and the circumferential direction U can be gathered from said figure for improved orientation.

FIG. 1(c) diagrammatically illustrates the stator 1 from FIG. 1(b) after the following production step. The ends 5.3 of the hairpin elements 5 which are plugged into the laminated stator core 2 from the plug-in side 2.1 are bent on the bending side 2.2 to form a stator winding 3 and are connected, for example welded, soldered or crimped. During the bending operation, the hairpin elements 5 are held in position by way of the end plate. A movement in the axial direction is prevented by way of the contact with the end plate, and a movement counter to the axial direction is prevented by way of an action of force of a plug-in tool on the hairpin elements 5 in the axial direction.

Figure 2:
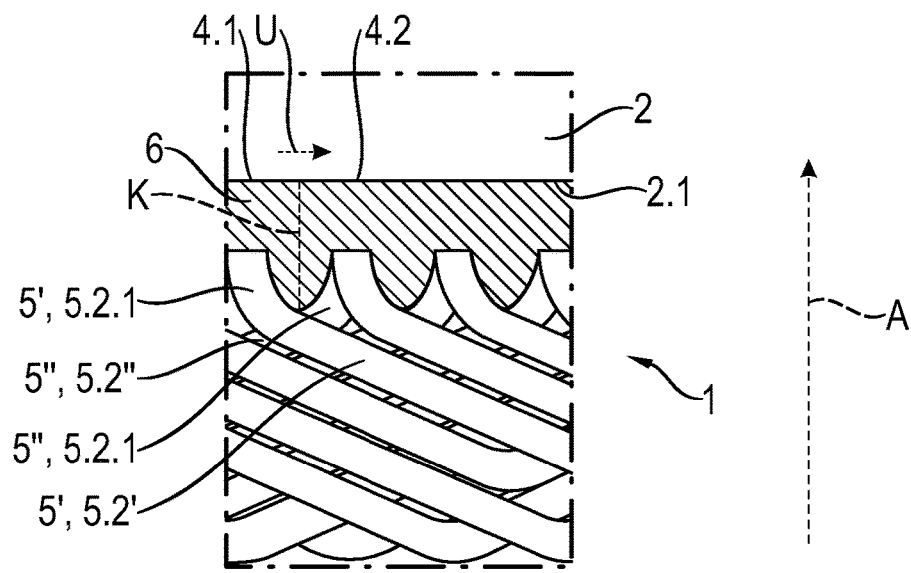
FIG. 2 diagrammatically illustrates a detail of a stator in accordance with one exemplary embodiment of the present invention.

FIG. 2 diagrammatically illustrates a detail of a stator 1 in accordance with one exemplary embodiment of the present invention. The hairpin elements 5 can be seen which project out on the plug-in side 2.1 of the laminated stator core 2.

The end plate 6 is arranged in the axial direction A between the hairpin elements 5 and the laminated stator core 2. The end plate 6 is preferably electrically insulating and elastic. Here, the end plate 6 is formed in such a way that it can support the hairpin elements 5 in the axial direction A in an optimum manner.

This can be described using two exemplary hairpin elements 5', 5".

A first hairpin element 5' is pushed with a first limb (not visible) into a first stator groove 4.1 of the laminated stator core 2. Here, the first stator groove 4.1 is likewise not visible, but its position is indicated by way of the corresponding designator. The first clip 5.2' of the first hairpin element 5' runs in the circumferential direction U.

A second hairpin element 5" is pushed with a second limb (not visible) into a second stator groove 4.2 of the laminated stator core 2, which second stator groove 4.2 is directly adjacent with respect to the first stator groove 4.1 in the circumferential direction U. The second stator groove 4.2 is likewise not visible here. Its position is indicated, however, by way of the corresponding designator. The second clip 5.2" of the second hairpin element 5" runs counter to the circumferential direction U.

The first transition region 5.2.1 of the first clip 5.2' and the second transition region 5.2.1 of the second clip 5.2" cross at a crossing spacing K from the laminated stator core 2. The end plate 6 follows the contour of the clips 5.2', 5.2" as far as the crossing spacing K, and bears against the clips 5.2', 5.2". As a result, a round shape of the end plate 6 is made possible, and the bearing face of the hairpin elements 5 against the end plate 6 is optimized.

During pushing in of the hairpin elements 5 in the axial direction A, the end plate 6 limits the possible travel. By way of a force measurement during pushing in, the bearing of the hairpin elements 5 against the end plate 6 can be determined. If the force reaches a maximum force, the pushing in can be ended and a defined winding head geometry can be achieved.

Figure 3:
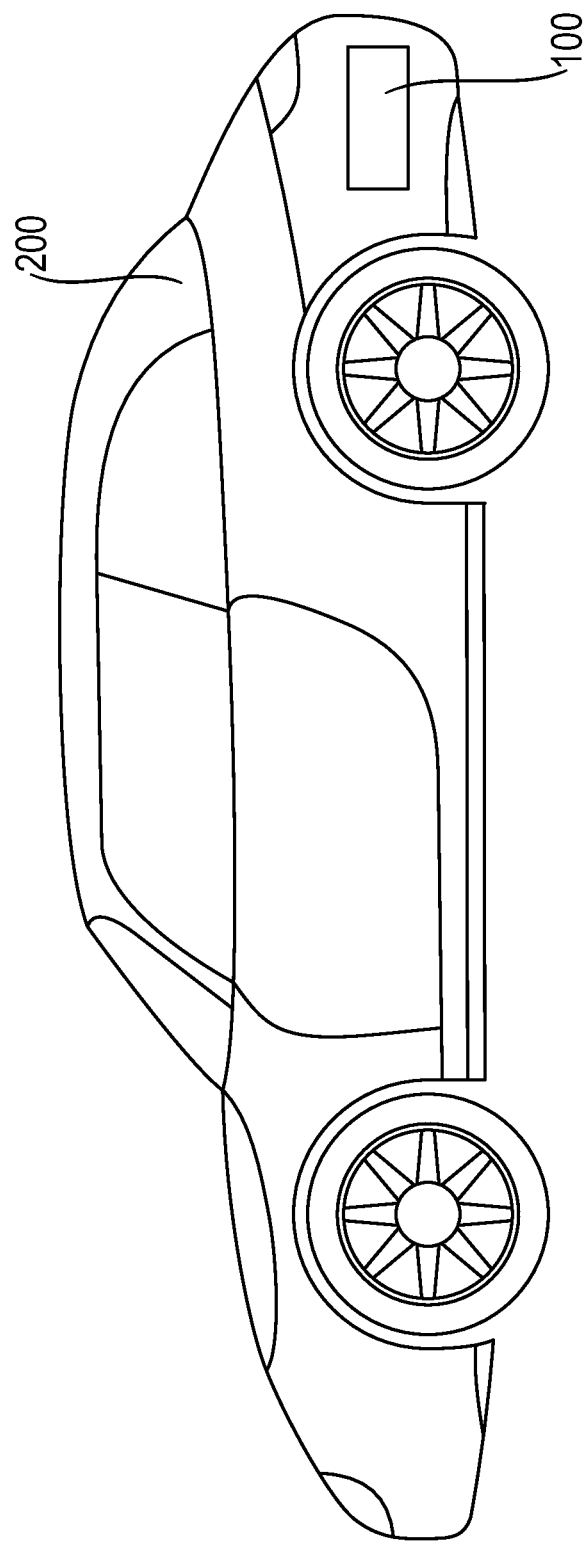
FIG. 3 diagrammatically illustrates a motor vehicle in accordance with one exemplary embodiment of the present invention.

FIG. 3 diagrammatically illustrates a motor vehicle 200 in accordance with one exemplary embodiment of the present invention with an electric machine 100 in accordance with one exemplary embodiment of the present invention.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for producing, a stator for an electric machine, the method comprising:
   providing a laminated stator core comprising stator grooves and having a plug-in side and a bending side, the bending side lying opposite the plug-in side in an axial direction;
   providing a stator winding having hairpin elements, which are pushed into the stator grooves on the plug-in side of the laminated stator core and bent and electrically connected to the stator winding on the bending side of the laminated stator core;
   providing an end plate with a first axial end towards the stator core and a second axial end away from the stator core, which is arranged on the plug-in side in the axial direction between the laminated stator core and the hairpin elements,
      wherein the hairpin elements are arranged in the axial direction so as to bear against the end plate,
      wherein the end plate is configured to conform with a surface of the laminated stator core at the first axial end, and
      wherein the end plate, at the second axial end, is rounded to fully conform with and bear against part of an inner contour of each of the hairpin elements;
   pushing the hairpin elements into the laminated stator core in the axial direction;
   measuring a force applied to the hairpin elements while pushing the hairpin elements into the laminated stator core;
   comparing the measured force applied to a maximum force value; and concluding the pushing in when the measured force applied reaches the maximum force value.

2. The method of claim 1, wherein the hairpin elements are pushed with, in each case, two straight limbs into the stator grooves, the limbs of each respective hairpin element of the hairpin elements being connected to a clip of the respective hairpin element of the hairpin elements, the clip being arranged at an angle with respect to the limbs.

3. The method of claim 2, wherein a first limb of a first hairpin element is arranged in a first stator groove with a first clip which is arranged so as to run in a circumferential direction of the stator,
   wherein a second limb of a second hairpin element is arranged in a second stator groove which is adjacent in the circumferential direction with respect to the first stator groove with a second clip which is arranged so as to run counter to the circumferential direction,
   wherein the first clip and the second clip cross one another at a crossing spacing in the axial direction from the laminated stator core, and
   wherein the end plate is configured in the axial direction so as to follow a contour of the first clip and a contour of the second clip as far as the crossing spacing.

4. The method of claim 3, wherein the clips have arcuate first transition regions which are arranged on the limbs, straight intermediate regions which are arranged on the first transition regions, and an arcuate second transition region which is arranged between the intermediate regions, and
   wherein the end plate is configured in the axial direction so as to at least partially follow a contour of the first transition regions but not follow a contour of the intermediate regions.

5. The method of claim 4, wherein the first clip and the second clip are arranged so as to cross one another in a region of the first transition region of the first clip and the first transition region of the second clip.

6. The method of claim 4, wherein the end plate includes a plurality of rounded protrusions at the second axial end that extend axially away from the laminated stator core.

7. The method of claim 1, wherein the end plate has openings which are arranged so as to run in the axial direction, and through which the hairpin elements are pushed into the stator grooves.

8. The method of claim 7, wherein all of the hairpin elements which run jointly in a stator groove are pushed into each opening.

9. The method of claim 1, wherein the end plate is electrically non-conducting.

10. The method of claim 1, wherein the end plate is elastic.

11. The method of claim 10, wherein the end plate is configured to elastically deform, thereby fully conforming with and bearing against part of the inner contour of each of the hairpin elements.

12. The method of claim 1, further comprising elastically deforming the end plate with the force used to push in the hairpin elements such that the end plate fully conforms with and bears against part of the inner contour of each of the hairpin elements.

* * * * *